(12) United States Patent
Lysytchuk et al.

(10) Patent No.: US 7,651,617 B2
(45) Date of Patent: Jan. 26, 2010

(54) METHOD FOR PURIFYING LIQUIDS BY USING IONIZED AERATION

(75) Inventors: Oleg Lysytchuk, Prazaka 3, 77200 Olomouc (CZ); Miroslave Spurny, Namest na Hane (CZ); Wladislav Rytschkow, Jekaterinburg (RU); Svetlana Rytschkowa, legal representative, Jekaterinburg (RU)

(73) Assignees: Oleg Lysytchuk (CZ); Jaroslav Hegr (CZ)

( * ) Notice: Subject to any disclaimer, the term of this patent is extended or adjusted under 35 U.S.C. 154(b) by 0 days.

(21) Appl. No.: 11/576,803

(22) PCT Filed: May 25, 2005

(86) PCT No.: PCT/CZ2005/000042
§ 371 (c)(1),
(2), (4) Date: Jul. 22, 2008

(87) PCT Pub. No.: WO2006/037282
PCT Pub. Date: Apr. 13, 2006

(65) Prior Publication Data
US 2009/0084729 A1 Apr. 2, 2009

(30) Foreign Application Priority Data
Oct. 6, 2004 (CZ) .................. 2004-1014

(51) Int. Cl.
*C02F 1/46* (2006.01)
*C02F 1/72* (2006.01)
(52) U.S. Cl. ..................... 210/668; 210/663
(58) Field of Classification Search ......... 210/668, 210/663, 600, 739, 748
See application file for complete search history.

(56) References Cited

U.S. PATENT DOCUMENTS

| 4,386,055 A * | 5/1983 | McBride ............... 422/186.18 |
| 5,766,447 A | 6/1998 | Creijghton et al. |
| 2002/0040875 A1 | 4/2002 | Conrad |

FOREIGN PATENT DOCUMENTS

| DE | 100 14 833 | 10/2001 |
| DE | 201 22 005 | 12/2003 |
| WO | WO 02/48053 | 6/2002 |

* cited by examiner

*Primary Examiner*—Walter D Griffin
*Assistant Examiner*—Cameron J Allen
(74) *Attorney, Agent, or Firm*—Ostrolenk Faber LLP

(57) ABSTRACT

Method for purifying liquids or fluids to eliminate harmful admixtures and microorganisms by using aerating and incidence of electric charges, wherein purified liquid undergoes gas-dynamic dispersion with the help of blast air passed through channels sloping below an angle of 30-50° according to a level of purified liquid, at a flow velocity of blast air of 10 to 100 m/s, at channel hydraulic resistance varying between 1.5 to 10 kPa and at specific consumption of dispersed water from 0.1 to 30 kg on 1 m³ of blast air. The blast air is previously preliminarily ionized in a non-homogenous electrostatic field of coronary discharges at a voltage between electrodes in a value range of from 3 kV to 10 millions V at corona current values between electrodes in a value range of from 10 to 1000 mA and at a specific power output of electrical discharges in a value range from 0.1 to 10 kWh on 1 m³ of conditioned liquid.

4 Claims, 2 Drawing Sheets

METHOD FOR PURIFYING LIQUIDS BY USING IONIZED AERATION

CROSS REFERENCE TO RELATED APPLICATIONS

The present application is a 35 U.S.C. §§ 371 national phase conversion of PCT/CZ2005/000042, filed May 25, 2005, which claims priority of Czech Republic Application No. PV 2004-1014, filed Oct. 6, 2004. The PCT International Application was published in the English language.

BACKGROUND OF THE INVENTION

The invention concerns methods for purifying liquids and fluids to eliminate harmful admixtures and microorganisms. It is possible to use the methods for not only purifying water in natural reservoirs but in a communal economy for water purifying or for purifying of municipal and industrial sewage water and sediments as well. The method for liquids purifying is also usable in energy production, chemistry and metallurgy for physical-chemical modification of all sorts of liquid media including melts and gases.

STATE OF THE PRIOR ART

There is a known method of water conditioning using a complex application of electric fields with a voltage reaching a value of a piercing current in a range of 1-100 kV/cm, as described in a publication by Jakovlev, S.V. and colleagues "Technology of electro-chemistry water conditioning" (Leningrad, Strojizdat 1987, page 207). A disadvantage of this method of water purifying is its low productivity, namely only 40 liters/hour at load 1 kW and energy demand depending on quality of conditioned water from 0.1 to 5 kWhour/m$^3$.

There is also a known method of water conditioning by ozonization according to a publication by Orlov, V. A "Water ozonization" (Moscow, Strojizdat, 1984, page 89) which mentions that an optimum dosage of ozone is from 0.25 to 1.25 mg/liter, wherein usage of ozone and mixing it with water allows reducing a dosage of coagulants. This makes it possible to achieve quality of purifying, which is suitable to meet a sanitation standard for bacteria and virus content.

Water purifying may be carried out by simultaneous electro-coagulation and electro-floatation, as mentioned for example in U.S. Pat. No. 3,822,204, wherein liquid goes through an arrangement above tabular electrodes in a lower part of an electro-floater, above its bottom. The electrodes generate gas bubbles that move solid elements of impurities on the surface of the liquid. Contemporary electrochemical modification of liquids and electro-floatation is described for example in patents U.S. Pat. No. 3,893,900 or GB 1411388, and a combination of electrochemical modification and ozonization for example are described in patent CZ 284039.

US 2002/0040875 A1 describes a way of purifying liquids, for example water, in which gas passes through a corona of an electric field periodically created by a generator and the gas is brought into the liquid by a spraying device. The air which passes through the generator, at disconnection of the electric current, cools the interior of the generator effectively. Disadvantages of this way are that it uses a relatively complicated construction of the device and also that the processes proceed in a laminar diffusion manner. The latter is an impediment to achieve a high load with the device, which does not allow complex purifying of water, for example to eliminate composite chemical and organic compounds.

A further known way of purifying liquids according to WO 02/48053 includes liquid saturated with gas bubbles being exposed to the effect of an electric field in order to create an ionization effect in the gas bubbles. A disadvantage of the described device is its complicated construction and low load, due to processes of laminar diffusion, because it is not possible to compound the effects of dynamic movement of gas with electro-dynamic effects of the electric field.

Finally, there is a known device for modifying mechanically, organically and biologically polluted water according to DE 10014833 A1, and DE 201 22 005 U1, which contains a system of filters, pumps, ionizer, reactor and filter on the output of the device. An ionization modules of the device is created by an ionization element with a large area of anodic and cathodic cage and with a differential gear, near which the cathodic cage is closed between two glass boards, with the anodic cage set on both sides of the cathodic cage. A disadvantage of this solution is its low speed of diffusion of ionized air bubbles and chemical reagents in capacity of water, which runs in a regime of laminar diffusion, as this results in a low load of device.

A mutual disadvantage of all the featured methods and devices for purifying and water conditioning is their relatively low productivity, the backwardness of the continuance of purifying process and imperfection of coordination of synchronous continuance of gas-dynamic and electro-physical modification of the liquid.

SUMMARY OF THE INVENTION

Increasing the quality of purification of small and big capacities of liquids to eliminate harmful pollutants and microorganisms, with a contemporaneous decrease of operating costs, is provided by a method for purifying liquids, especially purifying fluids, to eliminate harmful admixtures and microorganisms by using aerating and incidence of electrical discharge. In the invention, purified liquid is exposed to gas-dynamic dispersion with the help of blast air passed through channels that slope downward at an angle of 30-50° with respect to a level of purified liquid, at flow velocity of blast air of 10 to 100 m/s, at a channel hydraulic resistance varying between values from 1.5 to 10 kPa and at specific consumption of dispersed water from 0.1 to 30 kg at 1 m$^3$ of blast air. The blast air is at first preliminarily ionized in a non-homogenous electrostatic field of coronary discharges, at a voltage between electrodes in a range from 3 kV to 10 millions V, at corona current values between electrodes in a range from 10 to 100 mA and at specific load of electrical discharges in a range from 0.1 to 10 kWh on 1 m$^3$ of conditioned fluid.

Another feature of the invention is that the blast air is supported before ionization by reagents with high specific resistance exceeding values 10$^7$ Ohm·cm, and in a dosage that varies between 1 to 100 g/m$^3$ of blast air.

Finally, reagents are chosen from the group CaO or SiO$_2$ or Al$_2$O$_3$ and air blasting into purified water is performed by a high-speed ventilator.

Connection of a gas-dynamic process of dispersion of conditioned water with an electro-physical process of ionization of ventilator air, which disperses water, makes possible removal of all diffusion speed limitations of the process of physical-chemical interactions of the substances in liquid and gaseous phase. Further advantages are successful safe conditions for oxidation of harmful admixtures and destroyed structures of microorganisms by highly active free radicals, atoms, and molecules of ozone and oxidized complex of oxygen and nitrogen atoms. Basic technical parameters of the process, such as a mean flow speed of gas, regulation of liquid level height in the purifying device, voltage on electrodes and intensity of fluxion of coronary discharges between electrodes, are easily adjustable and controllable over a wide scale of technical parameter combinations. This make the method for purifying possible to use and easily adapted to different capacities and levels of liquid contamination. Because the processes of dispersion of conditioned water and the processes of ionization of ventilator air by coronary electrical discharges are thermodynamically reliable, there is a further increase of reliability of function and a decrease of demands on operating and maintenance of a device used. The result is minimal consumption of reagents, whereby there is a further decrease in the expenses of the purifying process.

BRIEF DESCRIPTION OF THE DRAWINGS

The drawings illustrate the invention as applied to purification of free levels of natural waters, such as lakes, ponds, dam reservoirs or rivers, and the basic scheme of a device for the method.

DESCRIPTION OF PREFERRED EMBODIMENTS

Example 1

Figure 1:
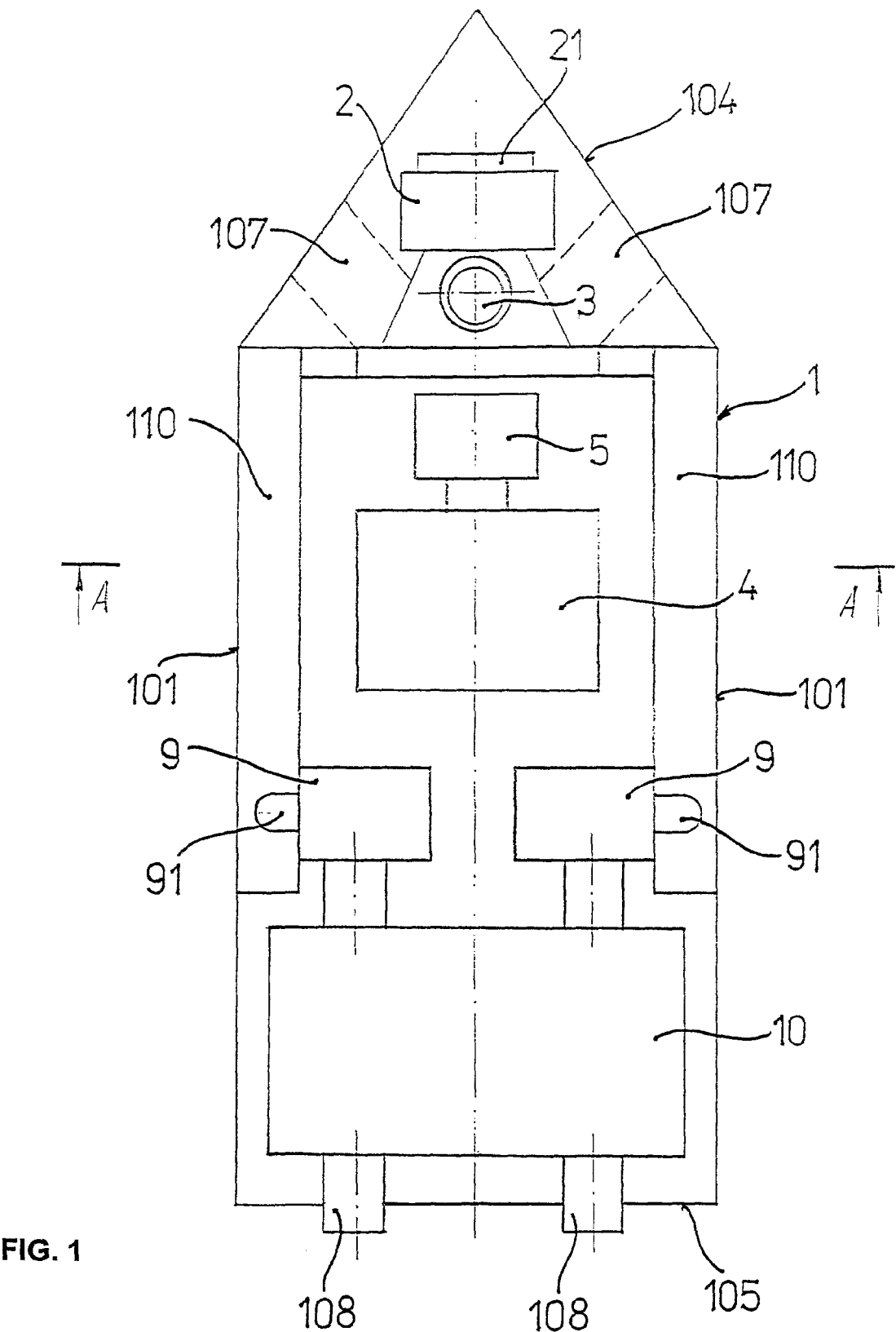
FIG. 1 is ground plan view of a masked off arrangement having a body created like a hull of a vessel.
Figure 2:
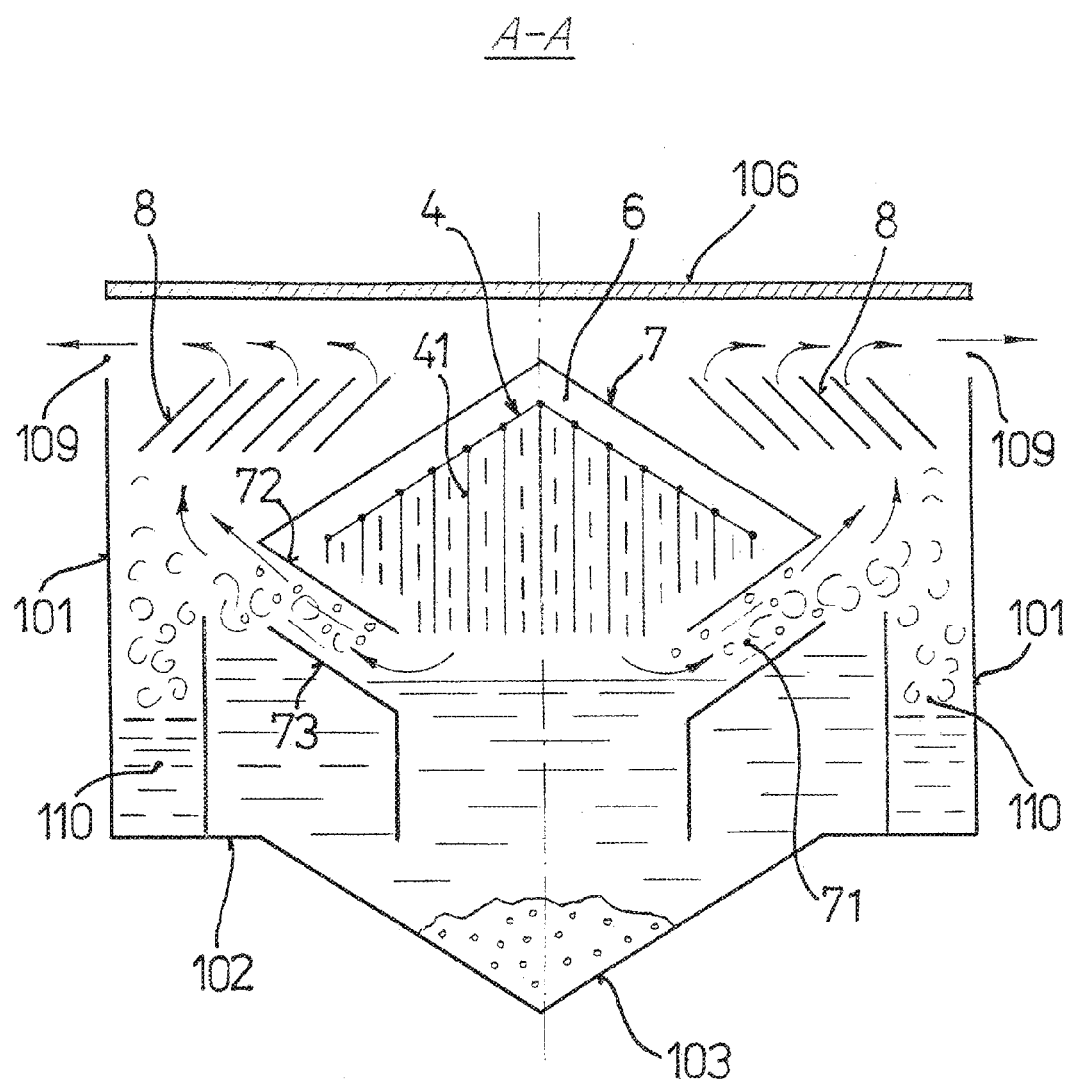
FIG. 2 is transverse vertical cut of this device in level A-A.

For purification of surface layers of natural water as in water reservoirs, where an excessive concentration of microorganisms are detected, for example anabaena and organic compounds with phosphorus content, phenols, and surface active substances, such as detergents, a floating type device is used and the method is performed.

The device includes a hollow oblong body 1 including side walls 101, bottom 102 provided with a median gullet 103, an arrowhead shaped front panel 104, a tail panel 105 and an upper removable lid 106, which defines a tank for the purifying process. Two balanced head openings 107 in the front panel 104 allow inflow of polluted water. Spouts 108 for outlet of purified water are in tail panel 105. There are sets of lateral windows 109 in the upper part of the side walls 101. A ventilator 2 is in the area of head openings 107 in the tank. It communicates with incoming neck 21 allowing supply of suctioned air and with reservoir 3 for supply of reagents.

An ionizer 4 is placed on an air outlet from the ventilator 2. The ionizer comprises a set of electrodes 41, lined up on a high voltage generator 5. Ionizer 4, particularly its electrodes 41, are in an air chamber 6, enclosed at the bottom by an open shell 7. The bottom of the shell is connected with crossways, upwardly directed and sideways guided channels that are 71 sloped below horizontal level at an angle of 30-50° and delimited between upper barriers 72 and lower barriers 73. Above exits from the channels 71, there are collectors 8 for liquid drops. Beside the outlet channels 71 are side walls 101 of the body 1.

Guided lateral chambers 110 are formed. The lateral chambers 110 have suction branches 91 and lead in pumps 9 that bring purified water via branches 91 into lower part of filters 10. The filters are for example granular filters with suctable coal of subbase high 0.5-2 m and speed of filtration of 1 m/min. Pure water is led away from the upper part of the filters 10 through spouts 108 and back to a water reservoir.

In an example of this device, a moderated pressure ventilator 2 is used with load of 60,000 m³/hour at an exit pressure of 5 kPa, and a power consumption that varies between values of 80-85 kW. A high voltage generator 5 is used which aggregates with a supply voltage of 380 V and a high voltage to 80 kV, whereas a current density for smooth coronary electrodes 41 has been leveled 0.08-0.1 mA/m.

During water purification, air from ventilator 2 passes between electrodes 41 of ionizer 4, which generates free electrons and free radicals in the air. Then the air is blown through channels 71 that are filled with polluted water. Air blows through is at a speed of 10-100 m/s at specific consumption of dispersive water from 0.1 to 30 kg/m³, which depends on the height o level in body 1 tank. Water effectively disperses into a large number of drops and foam with large active surface of liquid and gaseous phase interaction, at a hydraulic resistance of channels 71 at 1.5-10 kPa. The used ventilator air goes through drops collectors 8 and then is led away through lateral windows 109 of the body 1. Foam from oxygenated organic compounds and microorganisms is led away out of the upper parts of lateral chambers 110 with the help of a non-illustrated pump to cultivation. Sediments from inorganic harmful substances that settled in a median gullet 103 at the bottom 102 of the body 1 are regularly removed with the help of a non-illustrated sludge pump.

For water purification processes using the help of reagents, there are coagulants, flocculants and adsorbents led in ventilator air through reservoir 3, which increases the concentration of free electrons in conditioned water pursuant to their adsorption on the surface of solid adsorbents particles with high specific electric resistance in values more than $10^7$ Ohm·cm. Inside of channels 71, those particles transfer their electric charges and cause microorganisms and organic compound destruction and then settle at the bottom 102, from where they are drained like sediment.

Example 2

A technically modified device has been tested for gas purification from aluminous electrolyzes of a metallurgical factory with the help of a solution of $Na_2CO_3$, where the capacity of purified gas was approximately 360 m3/hour, the temperature of gases coming into the device was 42-50° C., the temperature of gases coming out of the device was 18-25° C. and the hydraulic resistance of the gases was 0.94-2kPa. A chemical analysis showed the composition of purified gas as 32-92 g/l $Na_2CO_3$, 7-60 g/l $NaHCO_3$ and 18-30 g/l NaF.

An analysis of purified gases, a measured value of gas dustiness before entering of the device was 0.16 to 0.27 g/m³ and after passage through device the measured in values 0.026 to 0.073 g/m³, which presents purification at an 85% level of dust and tar. For HF content in gas before entry into the device, HF values were in a range from 1 to 7 mg/m³. After passage through the device, those values were from 0 to 0.88 mg/m³, which presents gas purification from HF of 70 to 100%.

Example 3

The proposed method was tested to purify gas from dust coal used in a steam producing steam boiler which in quantity handles 40 t/hour and is heated up by glance coal. In this process, the capacity of exiting gases was 100,000 m³/hour, the starting gas dustiness was 12.29 to 35.8 g/m³ and the hydraulic resistance of the device was 1.4 kPa and the residual dustiness of the exiting gases 0.160 to 0.276 g/m³. The level of gas purification is approximately equal to a value of 99%.

These method for liquids purifying, especially fluids purifying, from harmful admixtures and microorganisms may be used for not only water purifying in natural reservoirs but in a communal economy at water purifying or for purifying of municipal and industrial sewage water and sediments as well. The method for liquids purifying are also usable in energy, chemistry and metallurgy and at physical-chemical modification of all sorts of liquid media, including melts and gases.

The invention claimed is:

1. A method for purifying liquids, or fluids, to eliminate harmful admixtures and microorganisms by using aerating and incidence of electric charges, the method comprising gas-dynamically dispersing purified liquid by a blast of air through channels sloping at an angle of between about 30-50° according to a level of purified liquid, at a flow velocity of blast air between 10 to 100 m/s, at a channel hydraulic resistance that varies between 1.5 to 10 kPa, and at specific consumption of dispersed water from 0.1 to 30 kg per 1 $m^3$ of blast air; and preceded by preliminary ionization in a non-homogenous electrostatic field of coronary discharges at a voltage between electrodes in a value from 3 kV to 10 millions V, at corona current values between electrodes in a value range from 10 to 1000 mA, and at specific power output of electrical discharges in a value range from 0.1 to 10 kWh on 1 $m^3$ of conditioned liquid.

2. A method for purifying liquids, or fluids, to eliminate harmful admixtures and microorganisms by using aerating and incidence of electric charges, the method comprising gas-dynamically dispersing purified liquid by a blast of air through channels sloping at an angle of between about 30-50° according to a level of purified liquid, at a flow velocity of blast air of between 10 to 100 m/s, at a channel hydraulic resistance that varies between 1.5 to 10 kPa, and at specific consumption of dispersed water from 0.1 to 30 kg per 1 $m^3$ of blast air;

preceded by preliminary ionization in a non-homogenous electrostatic field of coronary discharges at a voltage between electrodes in a value from 3 kV to 10 millions V, at corona current values between electrodes in a value range from 10 to 1000 mA, and at specific power output of electrical discharges in a value range from 0.1 to 10 kWh on 1 $m^3$ of conditioned liquid, wherein before ionization, enriching the blast air with reagents with high specific resistance exceeding $10^7$ Ohm·cm, in a quantity dosage varying between 1 to 100 g/$m^3$ of blast air.

3. The method for purifying liquids according to claim 1, wherein the reagents are selected from CaO, $SiO_2$ and $Al_2O_3$.

4. A method for purifying liquids, or fluids, to eliminate harmful admixtures and microorganisms by using aerating and incidence of electric charges, the method comprising gas-dynamically dispersing purified liquid by a blast of air through channels sloping at an angle of between about 30-50° according to a level of purified liquid, at a flow velocity of blast air of between 10 to 100 m/s, at a channel hydraulic resistance that varies between 1.5 to 10 kPa, and at specific consumption of dispersed water from 0.1 to 30kg per 1 $m^3$ of blast air;

preceded by preliminary ionization in a non-homogenous electrostatic field of coronary discharges at a voltage between electrodes in a value from 3 kV to 10 millions V, at corona current values between electrodes in a value range from 10 to 1000 mA, and at specific power output of electrical discharges in a value range from 0.1 to 10 kWh on 1 m3 of conditioned liquid, wherein the air is blasted into purified water by a high-speed ventilator.

* * * * *